US008044810B2

(12) United States Patent
Delia et al.

(10) Patent No.: US 8,044,810 B2
(45) Date of Patent: Oct. 25, 2011

(54) SYSTEM AND METHOD OF DAMAGE PREVENTION FROM WEATHER OCCURRENCES

(75) Inventors: David J. Delia, Lagrangeville, NY (US); Wayne M. Delia, Poughkeepsie, NY (US); Antonio O. Encarnacion, Jr., Cary, NC (US); Stacey L. Moore, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 517 days.

(21) Appl. No.: 12/246,061

(22) Filed: Oct. 6, 2008

(65) Prior Publication Data

US 2010/0085197 A1    Apr. 8, 2010

(51) Int. Cl.
*G01W 1/00* (2006.01)

(52) U.S. Cl. ..... 340/601; 340/602; 340/687; 455/414.3; 455/404.1

(58) Field of Classification Search .................. 340/601, 340/541, 565, 539.26–539.28, 628, 687, 340/539, 690, 7.48, 7.5; 455/404.1, 414.3; 73/170.16, 384
See application file for complete search history.

(56) References Cited

U.S. PATENT DOCUMENTS

| | | | | |
|---|---|---|---|---|
| 5,048,755 A * | 9/1991 | Dodds | ............................. | 239/64 |
| 5,959,815 A * | 9/1999 | Gilbert | ............................. | 361/1 |
| 5,963,130 A * | 10/1999 | Schlager et al. | ............... | 340/540 |
| 6,104,582 A * | 8/2000 | Cannon et al. | ..................... | 361/1 |
| 6,177,873 B1 * | 1/2001 | Cragun | ......................... | 340/601 |
| 6,204,761 B1 * | 3/2001 | Vanderable | ............... | 340/539.28 |
| 6,286,106 B1 * | 9/2001 | Flannery | ....................... | 713/310 |
| 6,351,218 B1 * | 2/2002 | Smith | .......................... | 340/601 |
| 6,462,665 B1 * | 10/2002 | Tarlton et al. | .................. | 340/601 |
| 6,493,633 B2 * | 12/2002 | Baron et al. | ...................... | 702/3 |
| 6,617,964 B1 * | 9/2003 | Lamb | ........................... | 340/286.02 |
| 6,674,625 B1 * | 1/2004 | Page | .............................. | 361/117 |
| 6,696,942 B2 * | 2/2004 | Sweatt | ........................ | 340/539.1 |
| 6,920,204 B1 | 7/2005 | Tuttle | | |
| 7,039,386 B2 * | 5/2006 | Kolsrud | ...................... | 455/404.1 |
| 7,088,254 B2 * | 8/2006 | Liebenow | ...................... | 340/601 |
| 7,103,480 B2 * | 9/2006 | Intriligator et al. | ................ | 702/3 |
| 7,136,725 B1 | 11/2006 | Paciorek et al. | | |
| 7,301,450 B2 * | 11/2007 | Carrino | ...................... | 340/539.11 |
| 7,679,507 B2 * | 3/2010 | Babich et al. | ............. | 340/539.16 |
| 7,786,891 B2 * | 8/2010 | Owens et al. | .................. | 340/541 |
| 7,808,378 B2 * | 10/2010 | Hayden | ........................... | 340/506 |
| 2004/0095237 A1 * | 5/2004 | Chen et al. | ...................... | 340/506 |
| 2005/0041355 A1 | 2/2005 | Page | | |

* cited by examiner

*Primary Examiner* — Daniel Wu
*Assistant Examiner* — Son M Tang
(74) *Attorney, Agent, or Firm* — George R. McGuire; Blaine T. Bettinger; Bond Schoeneck & King

(57) ABSTRACT

A method and system of damage prevention from weather occurrences is provided wherein incoming notifications from weather services are used to take action on user specified and configurable powered devices. Threshold levels may be set based on severity of weather occurrences. The threshold levels may be reset or reconfigured by a user of the system. Different threshold levels may be set for different devices in order that different devices may be deactivated at different threshold levels.

19 Claims, 2 Drawing Sheets

SYSTEM AND METHOD OF DAMAGE PREVENTION FROM WEATHER OCCURRENCES

BACKGROUND

The present invention relates generally to the field of device protection, and particularly to a system and method for providing protection of electronic devices from impending weather damage.

Electronic devices have become pervasive, important and in certain instances, necessary components in modern society today. As the range and variety of electronic devices has increased, so has a consumer's reliance on them. Even with increased productivity and functionality offered by the devices, unavailability of even one device may have a profound impact on the user. Interruptions caused by device inoperability may have an acute effect.

One such source of inoperability is due to weather occurrences. Certain electronic devices may be susceptible to weather events, such as lightning, hurricanes, tornados, high winds, ice storms and snow storms, which may render the devices inoperable. Even electronic devices which are sheltered in the confines of a home, office or the like, may be exposed to the characteristics of the weather event, such as a lightning strike to the structure, power surges, and the like. Such exposure may render an electronic device inoperable for a period of time, and may even destroy the electronic device.

The presence of severe weather conditions is becoming more commonplace due to the effects of global climate changes. Governments have invested heavily in the supercomputing applications of mid and long range weather forecasting, resulting in increased knowledge and warning capability. However, the capability of taking action as the result of this knowledge has not kept pace.

U.S. Pat. No. 7,088,254, which is hereby incorporated by reference, is directed to a system and method for providing a device with protection from a weather event. At least one weather characteristic of the weather event is determined and at least one device of a plurality of devices is ascertained as susceptible to the determined weather characteristic. Protective action is taken to protect the at least one device susceptible to the determined weather characteristic from the notified weather event. The disclosure does not provide for user configurable parameters associated with different levels of severity or does not take action based on user defined and configurable electronic devices.

There remains a need for damage protection of devices by customization. A need also exists for categorization of weather events. A further need exists for remote deactivation and reactivation.

Description Of the Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

SUMMARY

According to one embodiment of the present invention, a method of damage prevention of devices is provided wherein incoming notifications from weather services are used to take action on user specified and configurable powered devices.

According to another embodiment of the present invention, a method of configuring a damage prevention application system is provided, wherein threshold levels are set based on severity of weather occurrences. The threshold levels may be reset or reconfigured by a user of the system. Different threshold levels may be set for different devices in order that different devices may be deactivated at different threshold levels.

According to a further embodiment of the present invention, a method of converting weather warning messages into predetermined levels of severity is provided, whereby the messages are translated and compared with threshold levels on the user configurable system. If the threshold level is met or exceeded, the weather warning messages are translated into output commands and the output commands are sent to deactivate one or more devices at selected locations and the devices are deactivated.

In yet another embodiment, a method is provided wherein steps are taken based upon user configurable parameters associated with different levels of severity.

In still another embodiment, a method is provided wherein users are alerted through the use of emails and/or text messages. Alerts may be sent to a user's email address or to a user's cellular device In a further embodiment, a method is provided wherein a user can direct specific internet enabled power outlets from a web application directly or remotely, and can effectively and efficiently protect devices from severe weather occurrences.

In yet another embodiment, a method is provided wherein severe weather warnings are received from a weather monitoring service or a weather monitoring device.

According to still another embodiment, a method is provided wherein the deactivation of one or more devices can include disconnecting the device from an external connection or disabling power paths to sensitive electronic devices. The deactivation can be carried out by internet enabled power devices.

In another embodiment a method is provided wherein weather warnings comprise current location of a weather occurrence and/or location to which the weather occurrence may threaten.

In yet another embodiment, a system is provided wherein warnings generated by government agencies, are utilized, wherein a system of notifications and automated actions is provided to enable remote power management to avoid damage to devices, such as electronic equipment, as the result of approaching severe weather. In another aspect, the system may include a weather alert system, wherein the weather alert system provides weather alert data, a damage prevention application system, wherein the damage prevention application system receives the weather alert data, a user configured database, wherein the user configured database sets threshold parameters for the weather alert data in the damage prevention application system, and one or more internet enabled power devices, wherein the one or more internet enabled power devices receive a command from the damage prevention application system. In yet a further aspect, the weather alert system includes either a weather monitoring device or a weather monitoring service.

According to another embodiment of the present invention, a system is provided wherein a database receives notification input from weather services when severe weather is approaching. The database is linked to a system of internet enabled/programmable outlet controllers. The database automatically directs the outlet controllers to disable power paths to sensitive electronic equipment. In another aspect, the database automatically directs the outlet controllers to disconnect the one or more devices from an external connection. In a further aspect, the system includes a cellular device, wherein the cellular device receives a notification from the damage prevention application system regarding a severe weather warning. In yet another aspect, the system can set threshold parameters by severity of a weather occurrence.

According to yet another embodiment, a system is provided whereby users can personalize their unique applications, denoting the specific locations and echelon levels of outlet deactivation based upon the incoming alert severity.

In still another embodiment of the invention, a system is provided wherein a user can remotely receive weather alerts on an internet enable cellular device, and remotely disable powered devices as appropriate.

In a further embodiment, a computer program product encoded in a computer readable medium for instructing the deactivation of one or more devices is provided wherein instructions perform the method of setting threshold levels for weather occurrences, receiving a severe weather alert, converting the severe weather alert into a predetermined severity level, comparing the severity level of the weather alert with the threshold levels, if the threshold level is met, translating the alert to an output command, and using the output commands to deactivate one or more devices at selected locations. In a further aspect, the computer program product includes instructions for resetting the threshold levels.

In yet another embodiment, a computer program includes instructions for sending the output commands to an enabled/programmable controller to deactivate the one or more devices. In another aspect, the output commands disconnect one or more devices from an external connection or disable power paths to sensitive electronic devices. In a further aspect, the computer program product includes instructions for sending a notification of a severe weather warning to a cellular device. In yet another aspect, the computer program product includes instructions for setting different threshold levels for weather occurrences for different devices.

DETAILED DESCRIPTION

Embodiments of the present invention provide a system and method for protecting electronic devices that could be damaged by the occurrence of severe weather such as, lightning, high winds, tornados, hurricanes, snowstorms and the like, due to related power disturbances.

Figure 1:
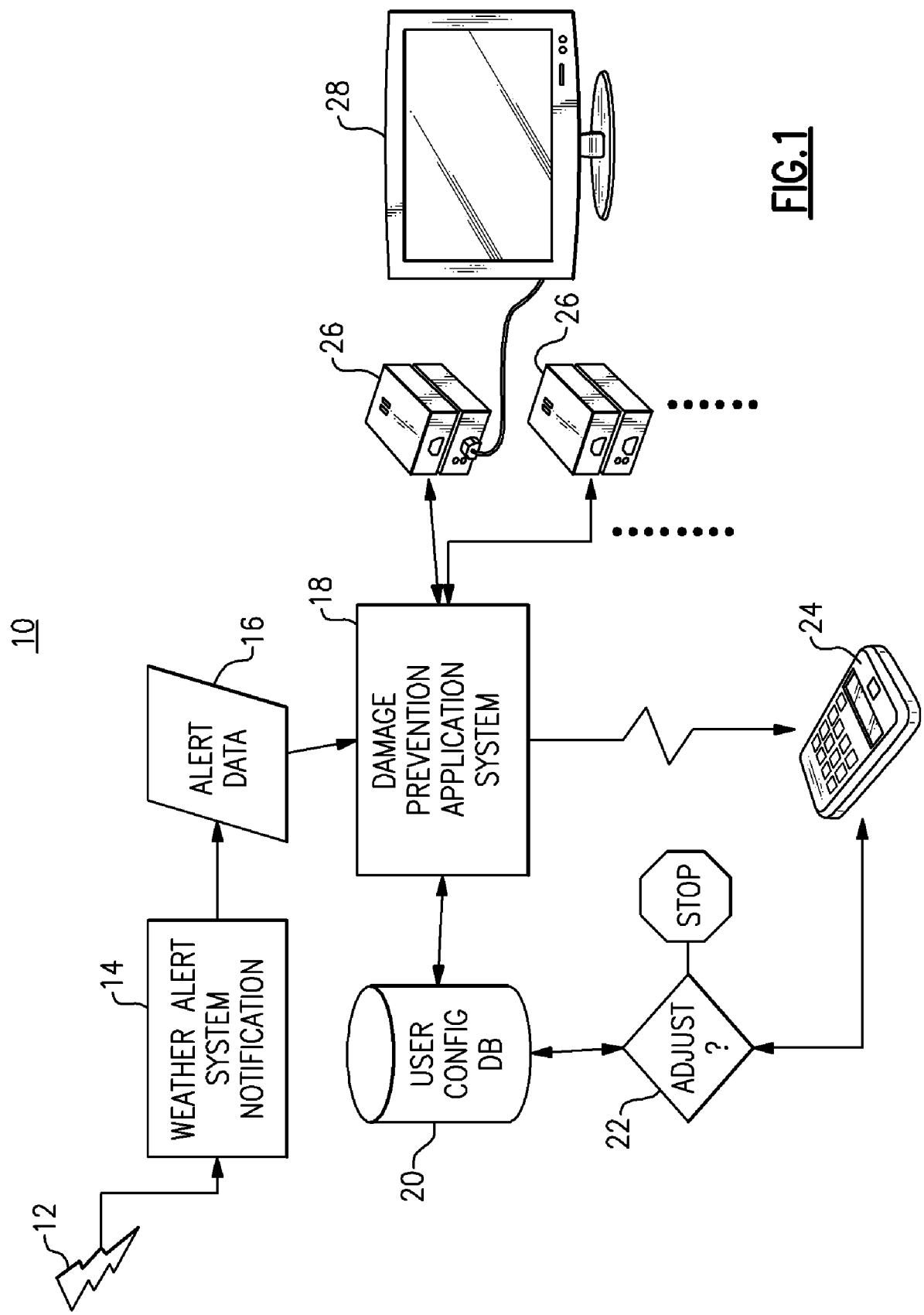
FIG. 1 shows a schematic diagram of an embodiment of the system of the invention.

Reference is made to FIG. 1, which shows an embodiment of the present invention of a system 10 for providing protection of electronic devices from damaging weather occurrences 12. System 10 includes a weather alert system notification 14 that monitors the weather and sends out alerts to users linked to the system. The alert system may include local, regional, national and international regions. Examples of agencies that issues alert warnings include, but are not limited to, the National Oceanic and Atmospheric Administration (NOAA), and NOAA sub-organizations, including the National Weather Service (NWS) and the Emergency Managers Weather Information Network (EMWIN), and the U.S. Geological Survey (USGS), and international organizations such as the European Centre For Medium-Range Weather Forecasts (ECMWF). These agencies parse the alert data to user specific location and risk tolerance and passively send alert signals via pager to subscribed users.

Alert data 16 received in the weather alert system notification 14 may be categorized by type of weather event, location of weather event, length of weather event and severity of the weather event. Alert data 16 is sent to a damage prevention application system 18 by various means, such as, by a separate radio signal or via the internet. The severe weather alerts are broadcast from the National Weather Services on an as needed basis. A prediction of an impending storm would generate a severe weather alert from the National Weather Service. An example of an alert is as follows:

---

Statement as of 3:34 PM EDT on Aug. 12, 2008

. . . A strong thunderstorm in Warren and Washington counties . . .
At 330 PM EDT . . . National Weather Service Doppler radar indicated a thunderstorm capable of producing . . . frequent lightning . . . heavy rain . . . and a wind gust to 30 mph. This storm was located near Huletts Landing . . . or about 7 miles northwest of Whitehall . . . and moving southeast at 29 mph.
The thunderstorm will be near . . .
Whitehall by 345 PM EDT
Comstock by 355 PM EDT
Granville and 8 miles northeast of Hartford by 400 PM EDT
If on or near Lake George or Lake Champlain . . . get out of the water and move indoors or inside a vehicle. Remember . . . lightning can strike out to 15 miles from the parent thunderstorm. If you can hear thunder . . . you are close enough to be struck by lightning. Move to safe shelter now. Don't be caught on the water in a thunderstorm!

---

Such alert data 16 would be received by system 18. System 18 takes this alert data 16 and compares it to the thresholds that are set by a user configured database 20. Database 20 inputs the desired configuration to the damage prevention application system 18. Each user of the damage prevention application system 18 can be configure system 18 by their own set of parameters. The parameters can include, but are not limited to, specific types of weather occurrences, the severity of the weather occurrences, and specific devices or equipment that are effected by specific weather occurrences, location of the equipment and which equipment must be deactivated depending on the type or severity of the weather occurrence. For example, the location of a user's devices are set in the parameter thresholds. If the location of the weather occurrence falls within the threshold set, other parameters are checked. Location may be set by zip code, telephone number, actual physical geographic location, street address, or internet protocol (IP) address. These parameters may be adjusted periodically or at any time by a user of the system. For example, if the user acquires new electronic equipment, he may add the new equipment to the list of specific equipment that can be deactivated in the event of a severe weather occurrence.

The user may configure the weather occurrence based on severity such as by intensity of the lightning, intensity of the wind, and so on. Each level of intensity may for example, be assigned a number. Intensity 1 is a low level storm, intensity 2 is a moderate storm, intensity 3 is a powerful storm. Each parameter, e.g., wind, lightning, etc., may be assigned levels of intensity based on the strength of the wind or the location of the lightning. The level of intensity is then compared to the intensity level of the alert data. The user can determine what to do at each intensity level. Level 1 may require no action, or may require action for certain devices. Therefore, the user may configure the system such that certain equipment will be deactivated based on certain level of intensity, while certain equipment will be deactivated based on a higher level intensity. The user may further configure the system to reactivate certain or all equipment that has been deactivated after a weather event has ended or a storm passes.

User configured database 20 can be adjusted as shown at 22 at the site of database 20 or from a remote location by using the internet or a cellular device 24. Adjustments can be made at any time from any place.

At the occurrence of a severe weather event, an output signal is sent by the damage prevention application system 18 to one or more controllers or internet enabled power devices 26, such as a Network Power Switch Jr., available from Black Box Corp., Lawrence, Pa., which devices deactivate the respective electronic equipment such as television 28 to prevent damage, such as a shortage, that could be caused by a storm. Whatever devices or equipment are connected to controllers 26 will be deactivated. Deactivation occurs by ensuring that all electrical circuit connection between the devices and the power grid are severed.

The user may elect to configure the software such that after the storm has passed, the electronic devices that were switched off, can be turned on again. In this case, the damage prevention application system 18 is notified by the weather alert data 16 that the storm is over. System 18 sends outgoing signals to the internet enabled power devices 26 to reconnect the electronic equipment. Any type of electronic equipment may be selected to be deactivated at the onset of a storm including but not limited to, televisions, computers, air conditioners, heaters, and stereos. The system can automatically deactivate all devices previously specified by the user.

Additionally, the user may be sent notification to his cellular device at the occurrence of a weather event. In this way, if the user is away, such as on vacation or at work, at a location remote from the devices, the alert will notify him of the weather occurrence. The user may at this point reconfigure the application system, for example, to deactivate certain equipment not previously specified or deactivate certain equipment that was previously configured to deactivate at a higher severity level.

Figure 2:
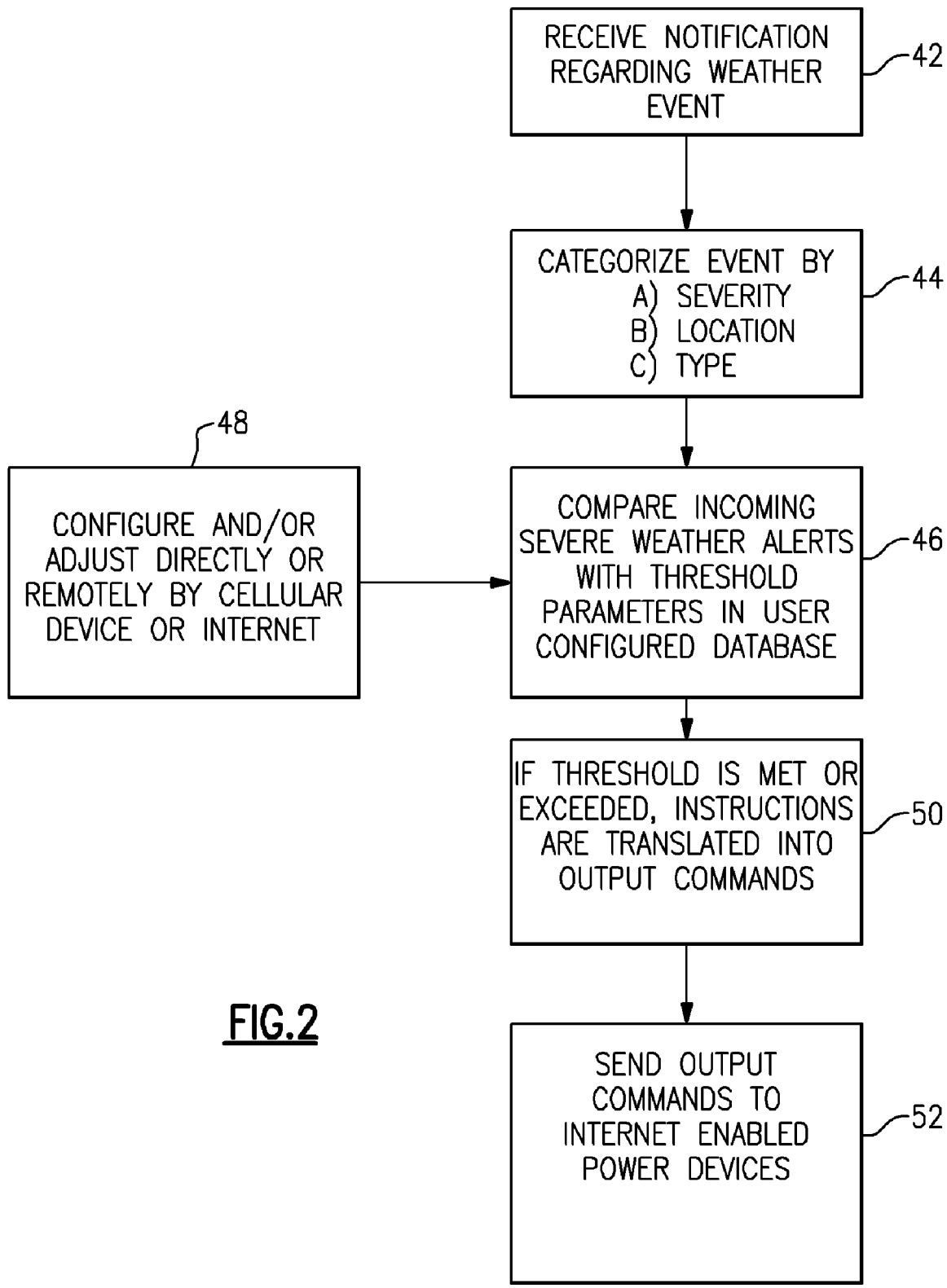
FIG. 2 shows a flow chart showing an embodiment of the logic of a system herein.

FIG. 2 is a flow chart 40 showing the steps involved in the operation of system 10. At step 42, a notification is received regarding a weather event. The event is categorized into various parameters including, but not limited to, severity of the weather event, location of the weather event, and type of weather event, at step 44. The event is categorized by the incoming weather alert. The parameters of the weather event are compared with the parameters in the user configured database, at step 46. The parameters of the database are input directly or remotely and may be adjusted at any time directly, or remotely, such as by cellular device or through the internet, at step 48.

If the threshold level is met, the categorized events are translated into output commands at step 50 and sent to internet enabled power devices. The internet enabled power devices then deactivate the specified electronic devices. Reactivation may also be programmed into the system after the storm has passed, or a command may be sent to the controller to reactivate the devices, which had been deactivated.

The method of an embodiment herein may be implemented within or between one or more computer systems, by executing computer-readable program code stored on computer-readable media. The computer-readable media may include, for example, any number or mixture of fixed or removable media (such as one or more fixed disks, random access memories (RAMs), read-only memories (ROMs), or compact discs), at either a single location or distributed over a network. The computer-readable program code may include, for example, instructions embodied in software or firmware.

The computer-readable program code may include various components, such as program code, code to display a user interface, and code to receive a plurality thresholds and or parameters regarding weather severity levels, type of weather occurrence and location of devices, via the user interface, and code to translate output to deactivate certain devices. Each of the parameters provides a user-configurable association between at least one threshold and the alert data provided in the weather notification.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A method comprising:
    providing a user configurable system that includes a plurality of enabled/programmable controllers, wherein the system is capable of recognizing a weather warning;
    receiving one or more system threshold level settings on the user configurable system from the user;
    receiving a weather warning;
    converting the recognized weather warning into a predetermined severity level;
    comparing the converted weather warning with a threshold level on the user configurable system;
    sending a notification of the weather warning to a user's cellular device or to a user's email address if the threshold level is met;
    translating the weather warning to an output command if the threshold level is met;
    using the output command from the enabled/programmable controllers to deactivate one or more devices at a selected location based upon the predetermined severity levels;
    deactivating the one or more devices via an Internet-enabled power device; and
    automatically reactivating the one or more deactivated devices after the weather warning expires.

2. The method of claim 1 further comprising reconfiguring the one or more system threshold levels.

3. The method of claim 1 wherein the weather warning is received from a weather monitoring service or weather monitoring device.

4. The method of claim 1 wherein deactivating one or more devices comprises disconnecting the device from an external connection.

5. The method of claim 1 wherein deactivating one or more devices comprises disabling power paths to sensitive electronic devices.

6. The method of claim 1 wherein the weather warning comprises a current location of a weather occurrence and a location to which the weather occurrence may threaten.

7. The method of claim 1 wherein the one or more system threshold level settings are set by severity of a weather occurrence.

8. The method of claim 7 wherein different system threshold level settings are set for different devices.

9. The method of claim 1 wherein the one or more devices may be deactivated at different system threshold level settings.

10. The method of claim 1 wherein the deactivating step is carried out by the user remotely.

11. A system for prevention of weather-related damage comprising:
- a weather alert system, wherein the weather alert system provides weather alert data;
- a damage prevention application system, wherein the damage prevention application system receives the weather alert data;
- a user configured database, wherein the user configured database sets one or more threshold parameters for the weather alert data in the damage prevention application system;
- a cellular device, wherein the cellular device receives a notification from the damage prevention application system regarding a severe weather warning; and
- one or more internet enabled power devices, wherein the one or more internet enabled power devices receive a deactivation command from the damage prevention application system and further wherein the one or more internet enabled power devices receive a reactivation command from the damage prevention application system after the weather warning expires.

12. The system of claim 11 wherein the weather alert system comprises a weather monitoring device or a weather monitoring service.

13. The system of claim 11 wherein the one or more threshold parameters are set by severity of a weather occurrence.

14. The system of claim 11 wherein the deactivation command comprises disconnecting the one or more devices from an external connection or disabling power paths to sensitive electronic devices.

15. A computer program product encoded in a non-transitory computer readable medium for instructing the deactivation of one or more devices comprising instructions for performing the method of:
- receiving one or more system threshold level settings for weather occurrences;
- receiving a severe weather alert;
- converting the severe weather alert into a predetermined severity level;
- comparing the severity level of the weather alert with the threshold levels;
- if the threshold level is met, sending a notification of a severe weather warning to a cellular device;
- if the threshold level is met, translating the alert to an output command;
- using the output commands to deactivate one or more devices via an Internet-enabled power device; and
- automatically reactivating the one or more deactivated devices after the weather warning expires.

16. The computer program product of claim 15 further comprising instructions for resetting the one or more system threshold level settings.

17. The computer program product of claim 15 further comprising instructions for sending the output commands to an enabled/programmable controller to deactivate the one or more devices.

18. The computer program product of claim 15 wherein the output commands comprise disconnecting one or more devices from an external connection or disabling power paths to sensitive electronic devices.

19. The computer program product of claim 15 wherein different system threshold level settings for weather occurrences are set for different devices.

* * * * *